United States Patent
Snijder et al.

(10) Patent No.: US 7,009,959 B1
(45) Date of Patent: Mar. 7, 2006

(54) MULTIPLE ACCESS COMMUNICATION SYSTEM

(75) Inventors: Pieter Jacob Snijder, Eindhoven (NL); Carel Jan Leendert Van Driel, Eindhoven (NL); Robert Marinus Hanenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 986 days.

(21) Appl. No.: 09/658,096

(22) Filed: Sep. 8, 2000

(30) Foreign Application Priority Data

Sep. 10, 1999 (EP) .................................. 99202953

(51) Int. Cl.
*H04B 7/212* (2006.01)

(52) U.S. Cl. ...................... 370/347; 370/310; 370/334; 370/342; 370/348; 370/319; 370/132; 370/135; 370/137; 370/140; 370/145; 370/147

(58) Field of Classification Search ................ 370/310, 370/334, 342, 347, 348, 319; 375/132–137, 375/140–147
See application file for complete search history.

(56) References Cited

U.S. PATENT DOCUMENTS 5,745,837 A * 4/1998 Fuhrmann ................... 725/114
6,181,687 B1 * 1/2001 Bisdikian .................... 370/347

FOREIGN PATENT DOCUMENTS

WO 9624207 A1 8/1996

OTHER PUBLICATIONS

"Channel Modelling of the Return Channel in a Broadband Communication CATV Network", Proceedings of the 28th European Microwave Conference, Amsterdam 1998, p. 517-522.

* cited by examiner

*Primary Examiner*—Wellington Chin
*Assistant Examiner*—Raj Jain

(57) ABSTRACT

The multiple access communication system according to the invention comprises at least one primary station (2) and a plurality of secondary stations (32, 34, 36). The primary station (2) and the secondary stations (32, 34, 36) are interconnected via a network, e.g. a coaxial cable network or a hybrid fiber/coax network. The secondary stations (32, 34, 36) can transmit return signals in a return signal frequency band to the primary station (2). However, the secondary stations (32, 34, 36) are arranged for transmitting the return signals in only a part of the return signal frequency band containing relatively little noise, e.g. the upper part of the return signal frequency band. The network comprises means (40) for mapping the return signals of the secondary stations (32, 34, 36) onto the full return signal frequency band, e.g. by means of a frequency converter (48, 50). In this way, the communication system is much less sensitive to noise, while still the same number of secondary stations (32, 34, 36) can be handled by the communication system.

6 Claims, 2 Drawing Sheets

MULTIPLE ACCESS COMMUNICATION SYSTEM

Figure 1:
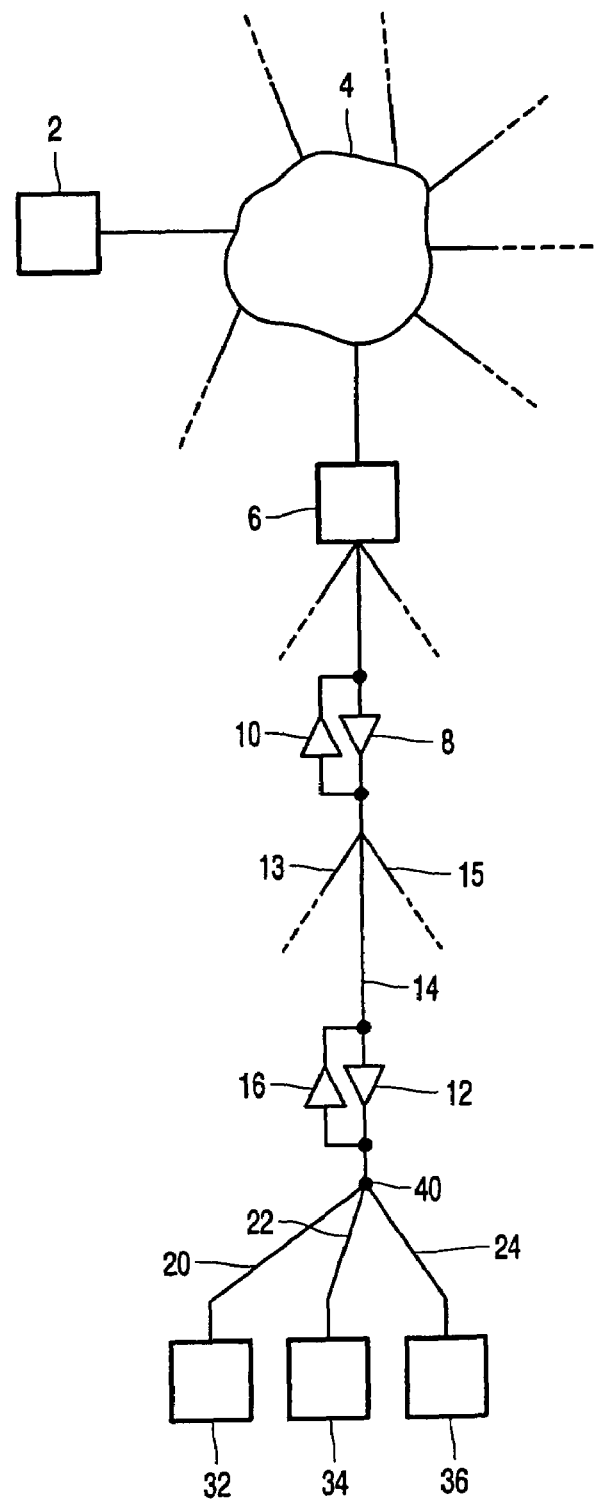

The invention relates to a multiple access communication system comprising at least one primary station and a plurality of secondary stations, the primary station and the secondary stations being interconnected via a network, the secondary stations being arranged for transmitting return signals in a return signal frequency band to the primary station, the secondary stations being further arranged for transmitting the return signals in only a part of the return signal frequency band containing relatively little noise.

A multiple access communication system according to the preamble is known from the paper entitled "Channel modelling of the return channel in a broadband communication CATV network" as published in the Proceedings of the 28$^{th}$ European Microwave Conference, Amsterdam 1998, p. 517–522. An example of such a multiple access communication system is a bi-directional interactive cable TV (CATV) system, which can for instance be based upon a coaxial cable network or a hybrid fibre/coax network. Modern CATV systems can deliver a whole range of interactive services to the subscribers, such as interactive television, telephone and internet. The subscribers are able to transmit data to the primary station or head end by means of a return channel. This return channel is a frequency band which is reserved for the transmission of upstream signals (return signals). In European CATV systems the return channel lies between 5 MHz and 65 MHz, while in the US the return channel lies between 5 MHz and 42 MHz. A problem with the return channel is that it's performance is adversely effected by noise, mainly ingress noise and impulsive noise, which penetrates the CATV system. This noise, which is most prominently present in the frequency range between 5 MHz and 25 MHz, almost exclusively penetrates the CATV system in the subscriber's homes due to the relatively poor quality of the in-home part of the cable network (i.e. cables, splitters, connectors and couplers). Moreover, the noise originating from the subscriber's homes is added by the network so that a relatively high noise signal level is reached. This process of noise addition is sometimes referred to as noise funnelling.

In the known multiple access communication system the return signals are transmitted by the secondary stations in a part of the return signal frequency band which contains relatively little ingress noise, i.e. in the part of the return signal frequency band lying above approximately 15 MHz. In this way, the ingress noise doesn't severely interfere with the return signals. However, by doing so only a part of the return signal frequency band is available for the transmission of the return signals by the secondary stations and, consequently, a relatively small number of secondary stations can be supported by the known multiple access communication system.

An object of the invention is to provide a multiple access communication system, which supports a relatively high number of secondary stations and which prevents the noise from severely interfering with the return signals. This object is achieved in the multiple access communication system according to the invention, which is characterized in that the network comprises means for mapping the return signals onto the return signal frequency band. If only a $$\frac{1}{n}$$

part of the return channel band or return signal frequency band is used for the transmission of a set of return signals accommodating the return signal traffic of k secondary stations, deeper in the network, preferably in a place where less noise occurs, the entire return channel bandwidth can be exploited again by mapping n sets of return signals onto the full return signal frequency band so that the return signal traffic of nk secondary stations can be accommodated. This can best be illustrated by means of an example: let's assume that the full European return channel band of 5–65 MHz can accommodate the return signal traffic of 300 secondary stations. Furthermore, let's assume that, in order to prevent noise from interfering with the return signals, only the 45–65 MHz part of the return channel band is used by the secondary stations for the transmission of the return signals. Hence, only a $$\frac{1}{3}$$

part (20 MHz) of the full return channel band (60 MHz) is used for the transmission of the return signals. As a consequence, this limited bandwidth of 20 MHz can only accommodate the return signal traffic of 100 secondary stations, i.e.

$$\frac{1}{3}$$

of the number of secondary stations accommodated by the full return channel band. The system is able to exploit the original capacity of 300 secondary stations by mapping three sets of 45–65 MHz return signals (each set accommodating the return signal traffic of 100 secondary stations) onto the full return channel band of 5–65 MHz.

An embodiment of the multiple access communication system according to the invention is characterized in that the part of the return signal frequency band is an upper part of the return channel band, the means for mapping the return signals comprising a down converter for down converting the frequency of at least one of the return signals. If the upper part of the return channel band is used for the transmission of a set of return signals, a down converter can conveniently be used to map such a set of return signals onto a lower part of the return channel band so that this lower part of the return channel band can also be used for the transmission of return signals to the primary station.

Figure 2:
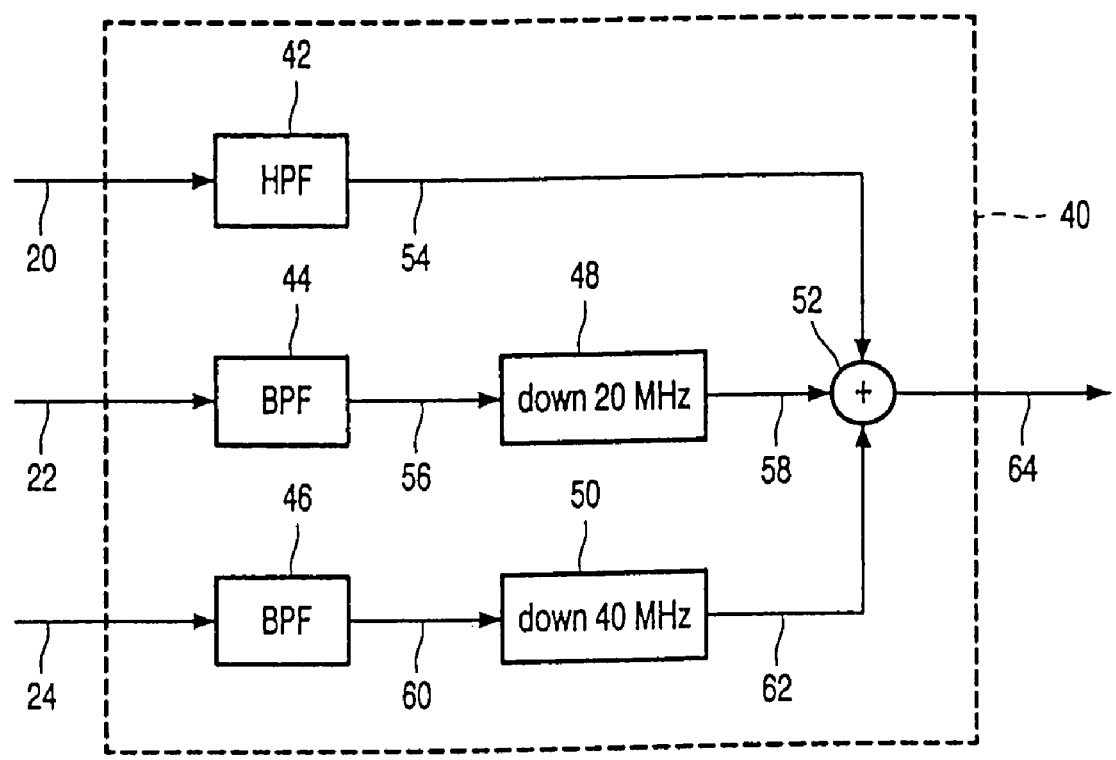

The above object and features of the present invention will be more apparent from the following description of the preferred embodiments with reference to the drawings, wherein:

FIG. 1 shows a block diagram of an embodiment of the multiple access communication system according to the invention, FIG. 2 shows a block diagram of an embodiment of the means for mapping the return signals onto the return signal frequency band.

In the Figures, identical parts are provided with the same reference numbers.

The multiple access communication system according to FIG. 1 is an interactive CATV system. A primary station or head end 2 is connected via a trunk network 4 to a local node 6, and to several other local nodes. An input/output of the local node 6 is connected with an input of a forward path amplifier 8 and to an output of a return path amplifier 10. The output of the forward path amplifier 8 and the input of the return path amplifier 10 are connected to a plurality of feeder cable sections 13, 14 and 15. The feeder cable section 14 is connected to an input of a forward path amplifier 12 and to an output of a return path amplifier 16. The output of the forward amplifier 12 and the input of the return path amplifier 16 is connected to drop cable sections 20, 22, and 24, which drop cable sections are connected to secondary stations 32, 34, and 36 which are located in the subscriber's homes.

The multiple access communication system according to FIG. 1 basically consists of three sections: the trunk network, the feeder network and the drop network. The trunk network 4 is arranged for connecting the head end 2 to the local nodes. Optical fibre is often used in the trunk network 4, but also coaxial cable can be used in the trunk network 4. If the multiple access communication system has to serve a large area, the use of optical fibres in the trunk network can result in substantially lower costs.

Each local node is arranged for serving 100–1500 secondary stations. The forward path amplifier 8 and the return path amplifier 10 are arranged to have non overlapping pass bands in order to prevent instability. The output signal of the amplifier 8 is split into signals for the feeder cable sections 13, 14 and 15. The upstream or return signals from the feeder cable sections 13, 14 and 15 are combined to an input signal for the return path amplifier 10. The signal from feeder cable section 14 is amplified in the forward path amplifier 12, and distributed to the secondary stations 32, 34 and 36 via the drop cable sections 20, 22 and 24. The return signals from the secondary stations 32, 34 and 36 are transmitted via the drop cable sections 20, 22 and 24 and combined in means 40 for mapping the return signals onto the full return signal frequency band (e.g. 5–65 MHz), which means are located at the input of the return path amplifier 16.

In the subscriber's homes ingress and impulsive noise penetrates the CATV system. Only a part of the return signal frequency band, e.g. the frequency range between 45 and 65 MHz, is used by the secondary stations 32, 34 and 36 for the transmission of the return signals so that this noise, which is most prominently present in the frequency range between 5 and 25 MHz, cannot severely interfere with the return signals. In the means 40, which are located outside the subscriber's homes, the return signals (45–65 MHz) from the secondary stations 32, 34 and 36 are mapped onto the full return signal frequency band (5–65 MHz).

In general, the bandwidth of the part of the return signal frequency band used by the secondary stations to transmit the return signals in can accommodate a plurality k of secondary stations. In the means 40 several sets of k return signals are then mapped onto the full return signal frequency band.

FIG. 2 shows an embodiment of the means 40 for mapping the return signals onto the return signal frequency band. The return signals (5–65 MHz) which are transmitted by the secondary station 32 via the drop cable section 20 to the means 40 are filtered in a high pass filter 42 (cut off frequency 45 MHz) in order to get rid of the noise in the lower part of the return signal frequency band. The high pass filtered signals 54 (45–65 MHz) are fed to a first input of an adder 52. The return signals (5–65 MHz) which are transmitted by the secondary station 34 via the drop cable section 22 to the means 40 are filtered in a band pass filter 44 (pass band between 45 and 65 MHz) in order to get rid of the noise in the lower part of the return signal frequency band. The frequencies of the band pass filtered signals 56 (45–65 MHz) are down converted in a down converter 48 so that the therefrom resulting signals 58 have frequencies lying in the range between 25 and 45 MHz. These signals 58 are fed to a second input of the adder 52. The return signals (5–65 MHz) which are transmitted by the secondary station 36 via the drop cable section 24 to the means 40 are filtered in a band pass filter 46 (pass band between 45 and 65 MHz) in order to get rid of the noise in the lower part of the return signal frequency band. The frequencies of the band pass filtered signals 60 (45–65 MHz) are down converted in a down converter 48 so that the therefrom resulting signals 62 have frequencies lying in the range between 5 and 25 MHz. These signals 62 are fed to a third input of the adder 52. In the adder 52 the signals 54 (45–65 MHz), 58 (25–45 MHz) and 62 (5–25 MHz) are combined into a signal 64 having frequencies occupying the full return signal frequency band (5–65 MHz).

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. A multiple access communication system comprising at least one primary station and a plurality of secondary stations the primary station and the secondary stations being interconnected via a network, the secondary stations being arranged for transmitting return signals in a part of a return signal frequency band dedicated for transmission to the primary station containing relatively little noise, the network comprises:

means for mapping said return signals in said low noise part of the return signal frequency band onto the whole of the return signal frequency band.

2. A multiple access communication system according to claim 1, wherein the part of the return signal frequency band is an upper part of the return signal frequency band.

3. A multiple access communication system according to claim 1, wherein the network comprises a coaxial cable network.

4. A multiple access communication system according to claim 1, wherein the network comprises a hybrid fiber/coax network.

5. The multiple access communication system according to claim 1, wherein the means for mapping the return signals comprises a down converter for down converting the frequency of at least one of the return signals.

6. The multiple access communication system according to claim 5, wherein the down converter comprises a block down converter.

* * * * *